United States Patent [19]

Nakagawa

[11] Patent Number: 5,075,558

[45] Date of Patent: Dec. 24, 1991

[54] TRANSPARENT SHEET-LIKE PAD WITH REFLECTIVE GRID LAYER TO PROVIDE POSITION INFORMATION TO AN OPTICAL READER

[75] Inventor: Junji Nakagawa, Tokyo, Japan

[73] Assignees: Kuraray Co., Ltd., Kurashiki; Nihon Electronics Co., Ltd.; Mitsubishi Corporation, both of Tokyo, all of Japan

[21] Appl. No.: 603,178

[22] Filed: Oct. 25, 1990

[30] Foreign Application Priority Data

Oct. 31, 1989 [JP] Japan .................................. 1-285762
May 25, 1990 [JP] Japan .................................. 2-136248

[51] Int. Cl.$^5$ .......................... G06K 5/00; G06K 11/00
[52] U.S. Cl. ..................................... 250/556; 250/221; 340/710
[58] Field of Search ..................... 250/221, 208.1, 556, 250/566, 568; 235/472; 382/59; 340/709, 710

[56] References Cited

U.S. PATENT DOCUMENTS

| | | | |
|---|---|---|---|
| 4,260,979 | 4/1981 | Smith | 340/146.3 H |
| 4,409,479 | 10/1983 | Sprague et al. | 250/237 G |
| 4,686,329 | 8/1987 | Joyce | 178/18 |
| 4,751,380 | 6/1988 | Victor et al. | 250/221 |
| 4,799,054 | 1/1989 | House | 340/710 |
| 4,834,502 | 5/1989 | Bristol et al. | 350/322 |
| 4,920,260 | 4/1990 | Victor et al. | 250/221 |
| 4,942,621 | 7/1990 | Angwin | 382/59 |
| 4,984,287 | 1/1991 | Massoudi | 382/59 |

FOREIGN PATENT DOCUMENTS

| | | |
|---|---|---|
| 0081348 | 6/1983 | European Pat. Off. . |
| 3506309 | 8/1985 | Fed. Rep. of Germany . |
| 64-500553 | 2/1989 | Japan . |

Primary Examiner—David C. Nelms
Assistant Examiner—John R. Lee
Attorney, Agent, or Firm—Oblon, Spivak, McClelland, Maier & Neustadt

[57] ABSTRACT

A sheet-like pad having a grid pattern constituted by X-axis grid lines and Y-axis grid lines perpendicular to the X-axis grid lines, and adapted to be placed between a document and an optical reader of a type which comprises an optical scanner for scanning the document to read an image on the document while the document is radiated with first rays of light emitted therefrom and a position sensor for reading the grid pattern for locating the position of the optical reader on the document while the document is radiated with second rays of light emitted therefrom. The sheet-like pad comprises a film-like base having upper and lower surfaces opposite to each other, reflective layers formed on the upper surface of the base for periodically reflecting the second rays of light in first and second directions perpendicular to each other, and a protective layer formed on the upper surface of the base so as to overlay the reflective layers. Each of the base and the protective layer is made of material capable of passing therethrough both of the first and second rays of light.

11 Claims, 6 Drawing Sheets

TRANSPARENT SHEET-LIKE PAD WITH REFLECTIVE GRID LAYER TO PROVIDE POSITION INFORMATION TO AN OPTICAL READER

BACKGROUND OF THE INVENTION

1. Field of the Invention

The present invention generally relates to an optical reader for reading characters and/or graphic presentations which comprises an optical scanner having a position sensor, and more particularly, to a sheet-like pad for use with the optical reader. More specifically, the present invention relates to the sheet-like pad adapted to be laid below the optical reader for providing position information to the position sensor as the optical reader is moved above the sheet-like pad.

2. Description of the Prior Art

An optical reader of the type referred to above includes an optical scanner for reading, and providing an electric signal indicative of alphanumeric characters and/or graphic presentations depicted or reproduced on a sheet such as, for example, a sheet of paper. An example of this type of optical reader hitherto proposed is disclosed in, for example, Japanese Laid-open Patent Publication No. 1-500553 and U.S. Pat. No. 4,751,380.

The position sensor used in the prior art optical reader is an important tool to enable the optical reader to reproduce characters and/or graphic presentations accurately at required positions, by optically monitoring positional information imparted to the sheet or paper, when the characters and/or graphic presentations are printed out, displayed on a display device and/or stored in a data storage unit. In order for the positional information to be read by the optical scanner, a specially processed transparent film generally known as a sheet-like pad is utilized in association with the optical scanner.

The sheet-like pad referred to above has a grid pattern formed thereon or therein, having a plurality of equally spaced X-axis grid lines and a plurality of equally spaced Y-axis grid lines perpendicular to the X-axis grid lines. When in use, the sheet-like pad is laid beneath the optical scanner, particularly the position sensor, so that the latter can move above the sheet-like pad. As the position sensor is moved above the sheet-like pad traversing the grid lines, the position sensor counts the number of the grid lines which have been traversed thereby. The number of the grid lines so counted by the position sensor is converted into an electric signal representative of positional information which is subsequently issued by the optical scanner as a whole.

The sheet-like pad of the type used in the above described manner in association with the optical reader is required to satisfy the following requirements.

In the first place, the sheet-like pad must have a property that infrared rays of light emitted from the position sensor can be reflected by the sheet-like pad in a quantity greater than a predetermined value. Secondly, the grid pattern on the sheet-like pad should be such that a light responsive element sensitive to the infrared rays of light emitted from the position sensor can recognize the grid lines. In other words, the grid pattern on the sheet-like pad should include reflective and non-reflective areas alternating at predetermined intervals, said reflective areas being effective to reflect the infrared rays of light emitted from the position sensor. Finally, the sheet-like pad must have a transparency required for the optical scanner to receive rays of light, that is, must have a high light transmissivity with respect to visible rays of light.

An example of a prior art sheet-like pad hitherto designed to satisfy all of the foregoing requirements is schematically illustrated in FIGS. 12 to 14, reference to which will now be made for the purpose of discussion of the prior art believed to be pertinent to the present invention.

Referring first to FIG. 12 showing a perspective view of the prior art sheet-like pad 11, the sheet-like pad 11 is in the form of a film and has a periodic grid pattern of X-axis and Y-axis grid lines 12 forming square areas of uniform size thereon. FIG. 13 illustrates, on an enlarged scale, a portion of the sheet-like pad 11, and the grid lines generally identified by 12 are areas capable of absorbing infrared rays of light while the square areas of uniform size delimited by the grid lines 12 and generally identified by 13 are reflective area capable of reflecting the infrared rays of light.

As best shown in the sectional representation of FIG. 14, the sheet-like pad 11 is a multi-layered structure including a base layer 15 of polyester film, an infrared reflective layer 16, formed on one surface of the base layer 15 and capable of reflecting the infrared rays of light, and a protective layer 18. The infrared reflective layer 16 is of a multilayer structure including an Au-Ag alloy layer and an $InO_2$ layer. The grid lines 12 forming the grid pattern are in the form of infrared absorbing layers 17 formed on one surface of the infrared reflective layer 16 opposite to the base layer 15 by the use of any known screen printing technique. The infrared absorbing layers 17 forming the grid lines 12 contain a dyestuff having an infrared absorbility extremely higher than its absorbability to the visible rays of light. The dyestuff contained in the infrared absorbing layer 17 may be a commercially available dyestuff such as, for example, IRA-870 manufactured and sold by EXCITON CHEMICAL of U.S.A.

The protective layer 18 is for the purpose of protecting square portions of the infrared reflective layer 16, which essentially form the square areas 13, and the infrared absorbing layers 17, which essentially form the grid lines 12, from damage which may be brought about by the contact of the optical reader with the sheet-like pad 11, and for this purpose, this protective layer 18 is formed on the infrared reflective layer 16 so as to overlay the infrared absorbing layers 17.

With the prior art sheet-like pad 11 so constructed as hereinabove described, as best shown in FIG. 14, infrared rays of light 20 emitted from the position sensor so as to be incident upon the sheet-like pad 11 at an angle of incidence of 30° relative to the normal to the surface of the sheet-like pad are reflected in part by the non-reflective square areas 13, i.e., respective portions of the infrared reflective layer 16 which are not occupied by the infrared absorbing layers 17 forming the grid lines 12, and in part absorbed by the grid lines 12. On the other hand, visible rays of light 21 radiated by the optical scanner so as to be incident upon the sheet-like pad 11 at an angle of incidence of 45° relative to the normal to the surface of the sheet-like pad 11 are allowed to pass through both of the infrared reflective layer 16 and the infrared absorbing layers 17. Accordingly, the visible rays of light 21 pass through the sheet-like pad 11 to reach a document 22 placed underneath the sheet-like pad 11 and are then reflected by the document 22. The visible rays of light 21 so reflected by the document 22 carry image information descriptive of alphanumeric characters and/or graphic presentations on one surface of the document 22 and, hence, form the imagewise rays of light. The imagewise rays of light reflected from the document 22 subsequently pass through the sheet-like pad 11, specifically through only the infrared reflective layer 16 or both of the infrared reflective layer 16 and the infrared absorbing layers 17, and are eventually detected by the optical scanner.

Thus, while the infrared rays of light radiated by a infrared light source built in the position sensor are repeatedly reflected and absorbed so that the infrared light receiver also built in the position sensor can provide an electric signal (binary signals) synchronized with a periodic structure of the grid lines 12, the counting of the binary signals generated from the infrared light receiver in the position sensor can result in a detection of the position of the optical reader on the document.

The prior art sheet-like pad 11 of the above described structure has been found to have problems. Specifically, since the visible rays of light 21 pass through the infrared reflective layer 16 at least twice with portion of the visible rays of light 21 passing additionally through the infrared reflective layers 17 as indicated by broken lines 21a in FIG. 14, attenuation of light takes place and, therefore, the efficiency of utilization of the rays of light tends to be lowered.

Also, in order for the infrared absorbing layers 17 forming the fine grid lines 12 to be formed on the infrared reflective layer 16 in the form of the periodic structure by the use of the screen printing technique, the screen printing is required to be repeated several times while work parameters such as, for example, the temperature of material for the infrared absorbing layers 17, the condition of the base layer 15 and the infrared reflective layer 16, the printing speed and the printing direction are strictly managed and controlled. Accordingly, it is not easy to manufacture sheet-like pads of uniform quality. It is eventually pointed out that the conventional screen printing is ineffective to provide the grid pattern of grid lines 12 which satisfies a required dimensional precision.

Furthermore, the formation of the infrared reflective layer 16 over the entire surface of the base layer 15 by the use of a coating technique requires an increased consumption of a coating material, resulting in an increased cost of manufacture of the sheet-like pad.

SUMMARY OF THE INVENTION

The present invention has been developed with a view to substantially eliminating the above discussed problems inherent in the prior art sheet-like pad and is intended to provide an improved sheet-like pad of a type having a grid pattern constituted by X-axis grid lines and Y-axis grid lines perpendicular to the X-axis grid lines, and adapted to be placed between a document and an optical reader of a type which comprises an optical scanner for scanning the document to read an image on the document while the document is radiated with first rays of light emitted therefrom and a position sensor for reading the grid pattern for locating the position of the optical reader on the document while the document is radiated with second rays of light emitted therefrom.

In accordance with the present invention, the sheet-like pad comprises a film-like base having upper and lower surfaces opposite to each other, reflective layers formed on the upper surface of the base for periodically reflecting the second rays of light, and a protective layer formed on the upper surface of the base so as to overlay the reflective layers. The reflective layers may be formed either in a grid pattern with the grid lines constituted by the reflective layers or in a matrix of rows and columns leaving square areas defined by the reflective layers and delimited by non-reflective grid lines, through which lines the first and second rays of light can pass. Each of the base and the protective layer is made of material capable of passing therethrough both of the first and second rays of light.

With the sheet-like pad constructed according to the present invention, no infrared absorbing layer hitherto employed in the prior art sheet-like pad is required and, therefore, the first rays of light emitted from the scanner will not pass through the infrared absorbing layer, and that a portion of the first rays of light merely pass through the reflective layers once or twice according to the present invention. Therefore, an attenuation of the first rays of light can be advantageously minimized, permitting a maximized utilization of the rays of light. Particularly in the case where the reflective layers from respective square areas delimited by the non-reflective grid lines forming the grid pattern such as in the second mentioned preferred embodiment of the present invention, the total area of surface occupied by the reflective layers can be made smaller than that of the system wherein the grid lines are defined by the reflective layers, thereby achieving an increased efficiency of utilization of the rays of light used in the system as a whole.

Also, the reflective layers can be formed into the requisite structure by the use of any known photo-etching technique, and therefore, the sheet-like pad according to the present invention can readily and easily be assembled or manufactured with a stabilized quality. The use of the photo-etching technique should achieve a high dimensional precision of the reflective layers as compared with the conventional screen printing.

In addition, since the reflective layers are formed into the requisite structure, the amount of material used to form the reflective layers can be less as compared with the prior art sheet-like pad in which the reflective layers are formed all over the base layer.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the accompanying drawings, like reference numerals are used to denote like parts throughout the several views except for FIGS. 12 to 14, and:

DETAILED DESCRIPTION OF THE EMBODIMENTS

Figure 1:
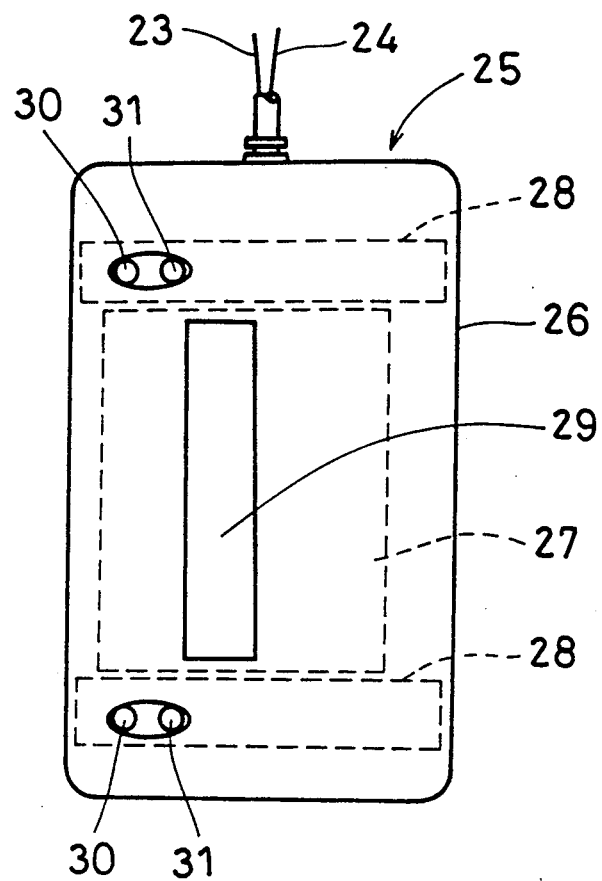
FIG. 1 is a schematic bottom plan view of an optical reader utilizable in combination with a sheet-like pad according to the present invention.

Before the present invention is described, an optical reader with which the present invention can be utilizable will first be described with particular reference to FIGS. 1, to 7. Referring first to FIG. 1 showing a bottom plan view of the optical reader 25, the latter comprises a housing 26 accommodating therein an optical scanner 27 operable with first rays of light such as visible rays of light and a pair of position sensors 28 positioned on respective sides of the optical scanner 27 and operable with second rays of light such as infrared rays of light. The housing 26 of the optical reader 25 includes a bottom wall having defined therein a generally rectangular light receiving window 29 associated with the optical scanner 27. The bottom wall of the housing 26 also has a pair of apertures, one for each of the position sensors 28, through which aperture light projecting and collecting lenses 30 and 31 are exposed to the outside. The optical scanner 27 and the position sensors 28 are electrically connected with an external signal processing circuit through respective lead lines 23 and 24.

Figure 2:
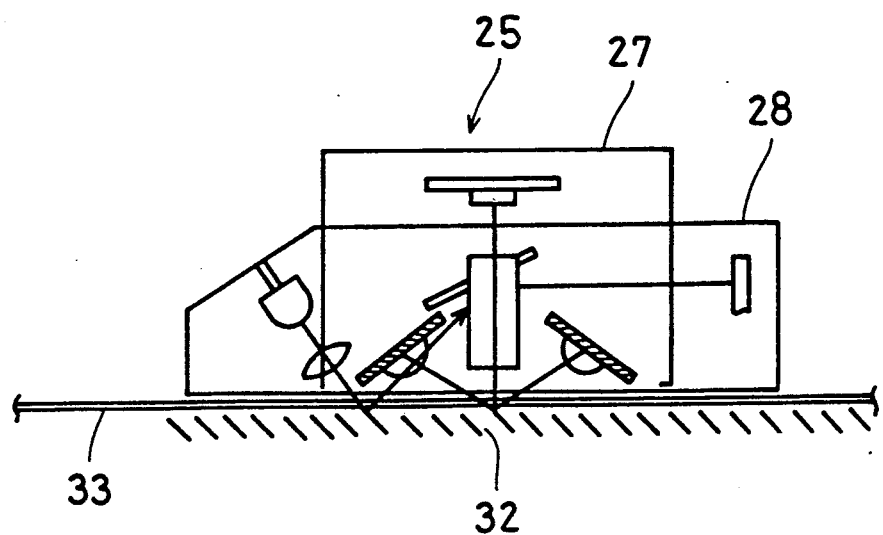
FIG. 2 is a schematic side sectional view of the optical reader of FIG. 1 showing an internal structure thereof.

As best shown in FIG. 2, the optical scanner 27 and the position sensors 28 are so arranged and so positioned that the optical scanner 27 can read a document 32 to be read and the position sensors 28 can read positional information originating from a sheet-like pad 33 positioned so as to intervene between the optical reader 25 and the document 32.

Figure 3:
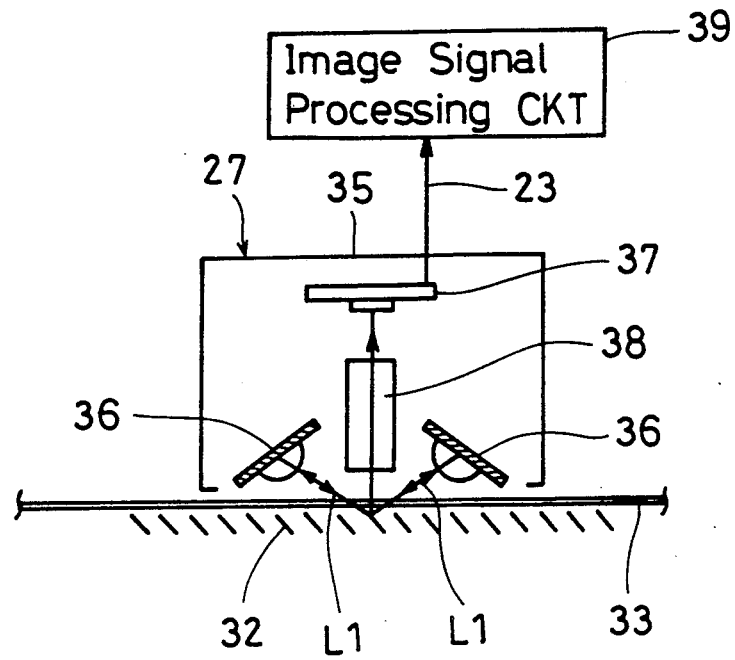
FIG. 3 is a schematic side sectional view showing an optical scanner forming a part of the optical reader.

The optical scanner 27 referred to above comprises, as best shown in FIG. 3, a scanner casing 35 accommodating therein a pair of light sources 36 for radiating the document 32 with visible rays of light L1, a light receiver 37 comprised of an array of photosensitive light receiving elements operable to detect imagewise rays of light originating from the light sources 36 and subsequently reflected by the document 32 within a predetermined time and also to convert the detected imagewise rays of light into an electric signal, and a lens assembly 38 for focusing the reflected visible rays of light L1 on the light receiver 37. The scanner casing 35 is not only to support the required component parts of the optical scanner 27 therein, but also to shield the interior of the scanner casing 35 from external rays of light which would otherwise constituted an external disturbance to the rays of light emitted by the light sources 36 and utilized by the light receiver 37. The light receiver 37 is electrically connected with an image signal processing circuit 39 positioned outside the scanner casing 35 and operable to perform an image processing and also to store processed image signals.

Figure 4:
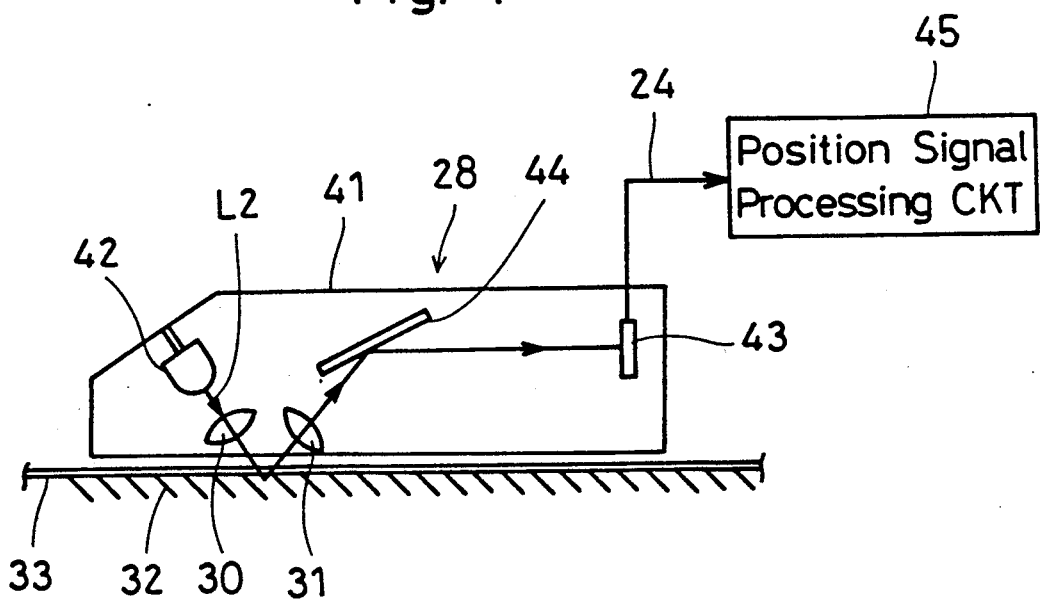
FIG. 4 is a schematic side sectional view showing a position sensor forming a part of the optical reader.

Each of the position sensors 28 comprises, as best shown in FIG. 4, a sensor casing 41 accommodating therein, a light source 42 for radiating the sheet-like pad 33 with infrared rays of light L2, a light projecting lens 30 operable to project the infrared rays of light L2 from the infrared light source 42 therethrough towards the document 32 accurately in a required light quantity and in a required width, an infrared light receiver 43 comprised of an array of photosensitive light receiving elements for sensing the infrared rays of light L2 which have been reflected from the document 32, a light collecting lens 31 operable to converge the infrared rays of light L2, reflected from the document 32 and travelling towards the infrared light receiver 43, so as to be accurately received by the infrared light receiver 43, and a reflecting mirror 44 interposed between the light collecting lens 31 and the infrared light receiver 43 for reflecting the infrared rays of light L2, collected by the light collecting lens 31, towards the infrared light receiver 43 so as to be focused thereon.

As is the case with the scanner casing 35 referred to hereinbefore in connection with the optical scanner 27, the sensor casing 41 is not only to support the required component parts of the position sensors 28 therein, but also to shield the interior of the sensor casing 41 from external rays of light which would otherwise constitute an external disturbance to the rays of light emitted by the infrared light source 42 and utilized by the infrared light receiver 43. The infrared light receivers 43 of the position sensors 28 are electrically connected with a position signal processing circuit 45 positioned outside the sensor casing 41 and operable to perform an arithmetic operation and a storage of position signals.

Figure 5:
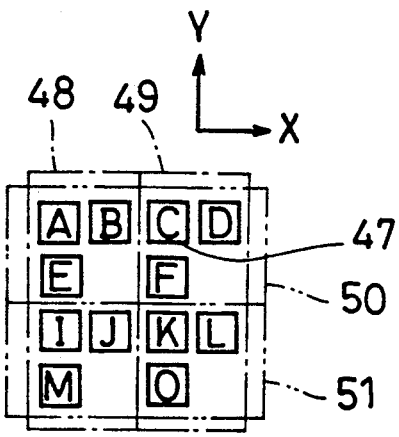
FIG. 5 is a schematic plan view showing an arrangement of photoelectric light receiving elements used in the position sensor.

The array of the photosensitive light receiving elements forming the infrared light receiver 43 in each of the position sensor 28 are generally identified by 47 in FIG. 5 and are arranged in a pattern as shown in FIG. 5. The pattern so far shown in FIG. 5 is made up of a pair of first divided, rectangular pattern areas 48 and 49, confronting with each other in an X-axis direction, and a pair of second divided, rectangular pattern areas 50 and 51, confronting with each other in a Y-axis direction perpendicular to the X-axis direction, and twelve photosensitive light receiving elements 47 are arranged in that pattern with each six elements 47 positioned within each rectangular pattern area 48 to 51. More specifically, assuming that the photosensitive light receiving elements 47 forming the infrared light receiver 43 are respectively designated by A, B, C, D, E, F, I, J, K, L, M and O as shown in FIG. 5 although the characters A to F and I to O are used as respective symbols allocated to output signals from the photosensitive light receiving elements as seen below, the elements A, B, E, I, J and M and the element C, D, F, K, L and O are positioned within the first divided, rectangular pattern area 48 and the first divided, rectangular pattern area 49, respectively, whereas the elements A to F and the elements I to O are positioned within the second divided, rectangular pattern area 50 and the second divided, rectangular pattern area 51.

Figure 6:
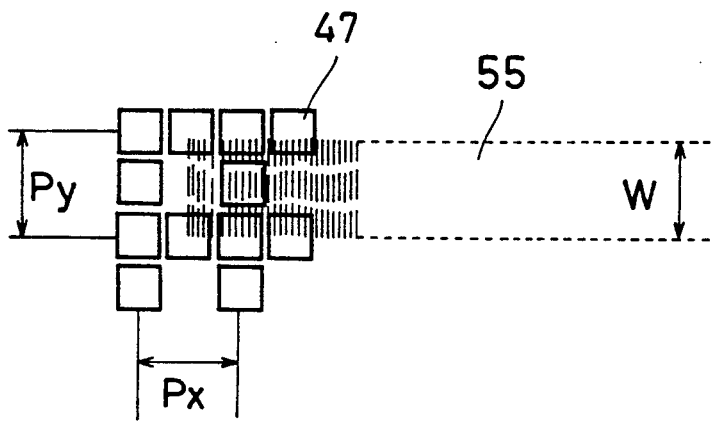
FIG. 6 is a schematic plan view showing a relationship between a grid pattern on the sheet-like pad and the photoelectric light receiving elements shown in FIG. 5.

The relationship between the pattern of the photosensitive light receiving elements 47 and grid lines 55 forming a grid pattern on the sheet-like pad 33 is shown in FIG. 6. Referring to FIG. 6, the width W of grid line 55 extending in the X-axis direction is so chosen as to be within the range of 90 to 100% of the interval Py between the adjoining second divided pattern areas 50 and 51 oriented in the Y-axis direction as shown in FIG. 5, and the same is with the width W of grid line 55 extending in the Y-axis direction which is equal to the width W in the X-axis direction and which is chosen to be within the range of 90 to 100% of the interval Px between the adjoining first divided pattern areas 48 and 49 oriented in the Y-axis direction.

Figure 7:
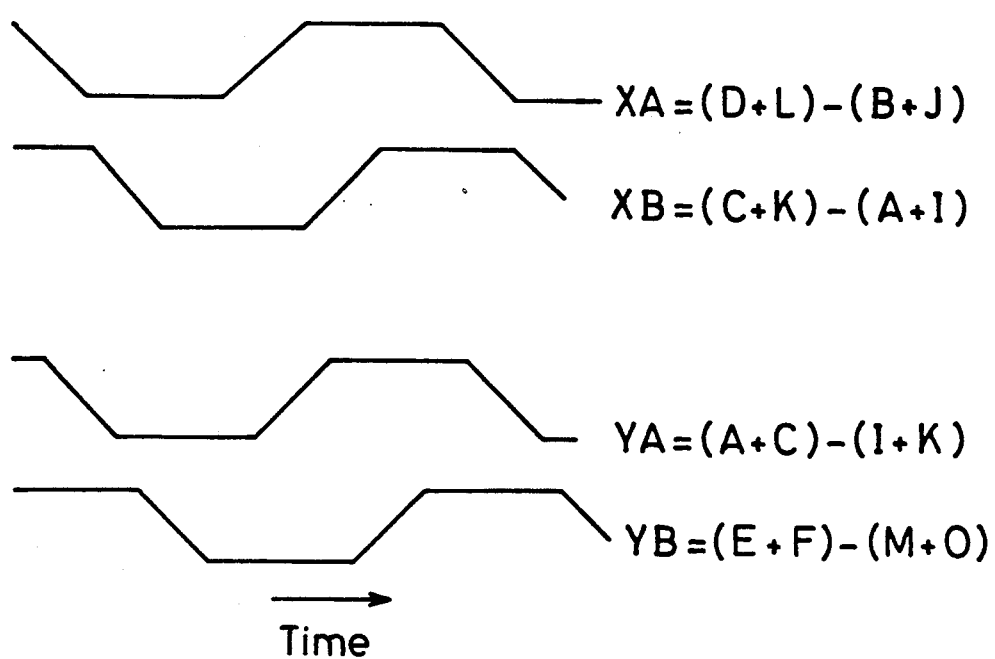
FIG. 7 is a chart showing various waveforms of signals outputted from the position sensor.

When respective outputs A to F and I to O from the twelve photosensitive light receiving elements 47 are processed in the position signal processing circuit 45 (FIG. 4) according to equations shown in FIG. 7 to provide two-phase electric signals XA, YA, XB and YB. The detection of set-up and set-down of each of the electric signals XA and XB can result in a detection of an X-axis coordinate defined by the grid lines 55 on the sheet-like pad 33, whereas the detection of set-up and set-down of each of the electric signals YA and YB can result in a detection of a Y-axis coordinate defined by the same grid lines 55.

Figure 8:
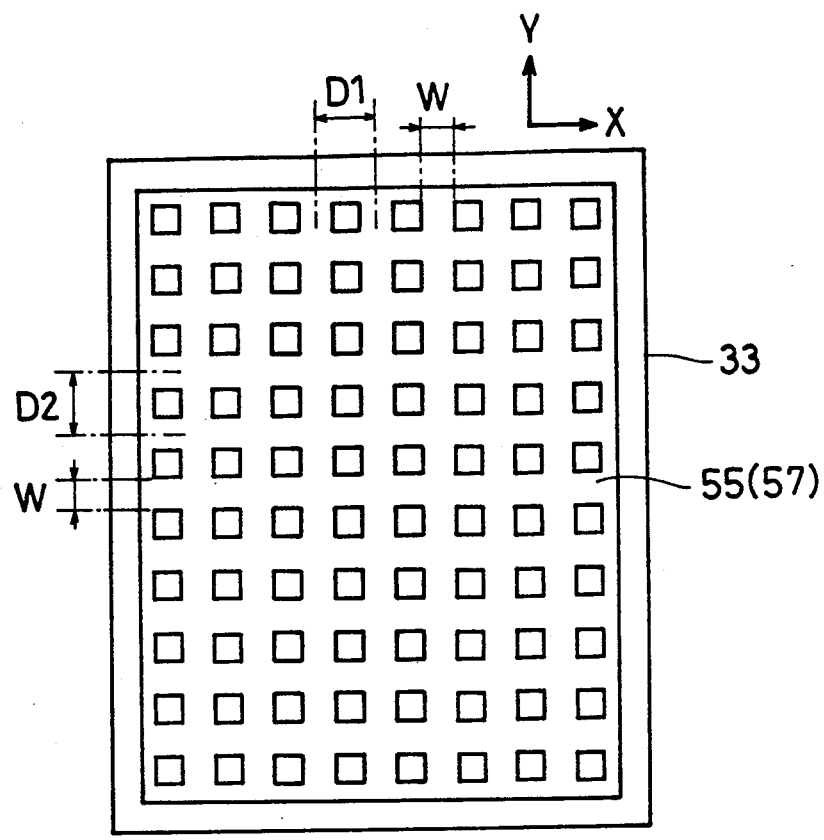
FIG. 8 is a top plan view of the sheet-like pad according to a first preferred embodiment of the present invention.
Figure 9:
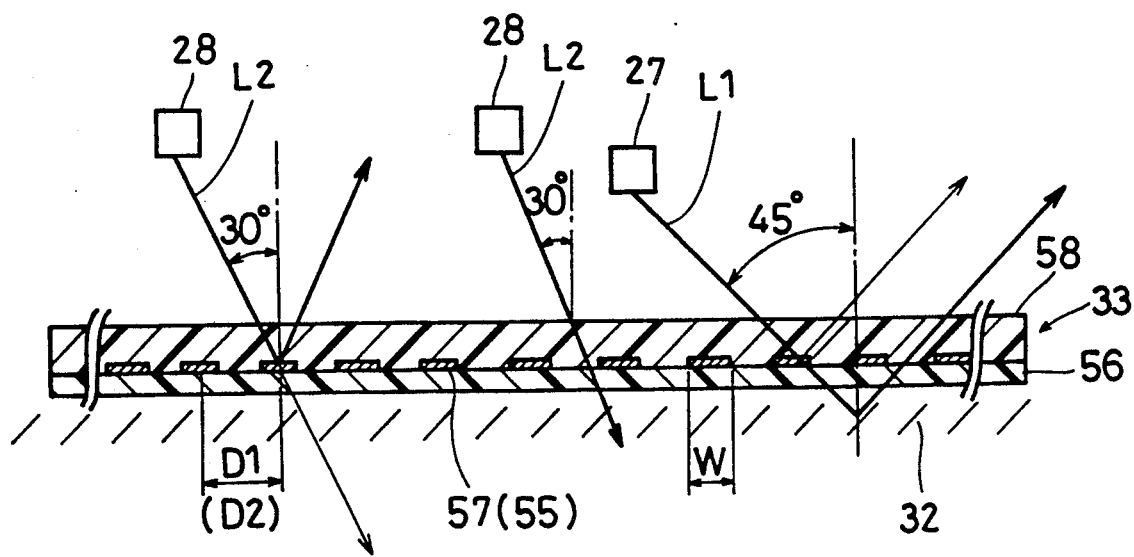
FIG. 9 is a schematic side sectional view, on an enlarged scale, of the sheet-like pad shown in FIG. 8.

Referring now to FIGS. 8 and 9, there is shown the sheet-like pad 33 designed according to a first preferred embodiment of the present invention. As shown in FIG. 8, the sheet-like pad 33 has a grid pattern comprised of grid lines 55 some extending in the X-axis direction and the remainder in the Y-axis direction. Each neighboring X-axis oriented grid lines 55 are spaced a predetermined pitch (periodicity) D2 and each neighboring Y-axis oriented grid lines 55 are spaced a predetermined pitch (periodicity) D1.

The details of the sheet-like pad 33 having the above described grid pattern are best shown in FIG. 9. As shown therein, the sheet-like pad 33 comprises a multilayered structure including a base layer 56 capable of passing both of the rays L1 and L2 therethrough and having an upper surface formed with a grid pattern of X-axis oriented and Y-axis oriented reflective layers 57 laid so as to cross with each other, said reflective layers 57 forming the grid lines 55. Each neighboring reflective layers 57 oriented in the X-axis direction and in the Y-axis direction are spaced an equal distance from each other. The multi-layered structure of the sheet-like pad 33 also includes a transparent protective layer 58 formed on the base layer 56 so as to overlay the grid-patterned reflective layers 57, which layer 58 is made of material of a property capable of passing both visible and infrared rays of light L1 and L2 therethrough.

With the sheet-like pad 33 so constructed as hereinabove described, as shown in FIG. 9, the infrared rays of light L2 emitted from the position sensor 28 so as to be incident upon the reflective layers 57 at an angle of incidence of 30° relative to the normal to the surface of the sheet-like pad 33 are reflected by the reflective layers 57 in an extremely great quantity while the rest of the infrared rays of light L2 are passed therethrough. Also, the infrared rays of light L2 similarly emitted from the position sensor 28 so as to be incident upon portions of the base layers 56 delimited by the reflective layers 57 are passed therethrough without being substantially reflected thereby. Thus, the infrared rays of light L2 emitted from the position sensor 28 are in part reflected by the grid-patterned reflective layers 57 and in part passed through those portions of the base layer 56 delimited by the grid-patterned reflective layers 57 and, therefore, the position sensor 28 can provide binary signals (the respective waveforms of which are shown in FIG. 7) synchronized with the periodic structure of the grid lines 55. By counting the electric signals from the position sensors 28, the position of the optical reader on the document can be detected.

On the other hand, visible rays of light L1 radiated by the optical scanner 27 so as to be incident upon the reflective layers 57 at an angle of incidence of 45° relative to the normal to the surface of the sheet-like pad 33 are reflected by the reflective layers 57 in an extremely small quantity while the rest of the visible rays of light L1 are allowed to pass therethrough. Also, the visible rays of light L1 similarly emitted from the optical scanner 27 so as to be incident upon those portions of the base layer 56 delimited by the grid-patterned reflective layers 57 are allowed to pass therethrough without being reflected thereby. Thus, the visible rays of light L1 having passed through the sheet-like pad 33 are subsequently reflected by the document 32 placed beneath the sheet-like pad 33 with the reflected visible rays of light L1 consequently carrying image information descriptive of alphanumeric characters and/or graphic presentations on one surface of the document 32. The imagewise rays of light subsequently pass through the sheet-like pad 33, having passed in a major quantity through the reflective layers 57 and are eventually detected by the optical scanner 27.

Figure 10:
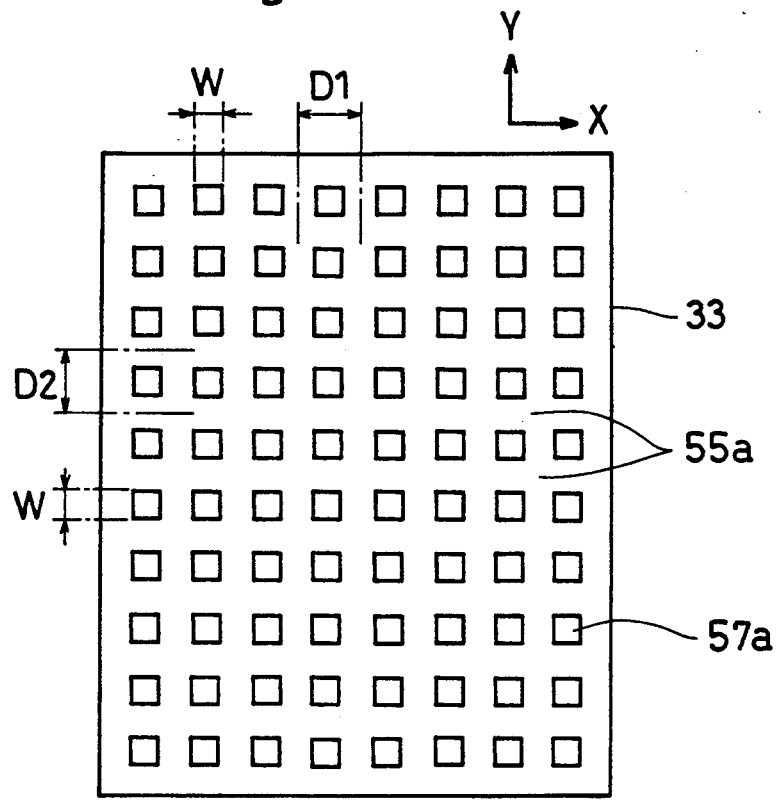
FIG. 10 is a top plan view of the sheet-like pad according to a second preferred embodiment of the present invention.
Figure 11:
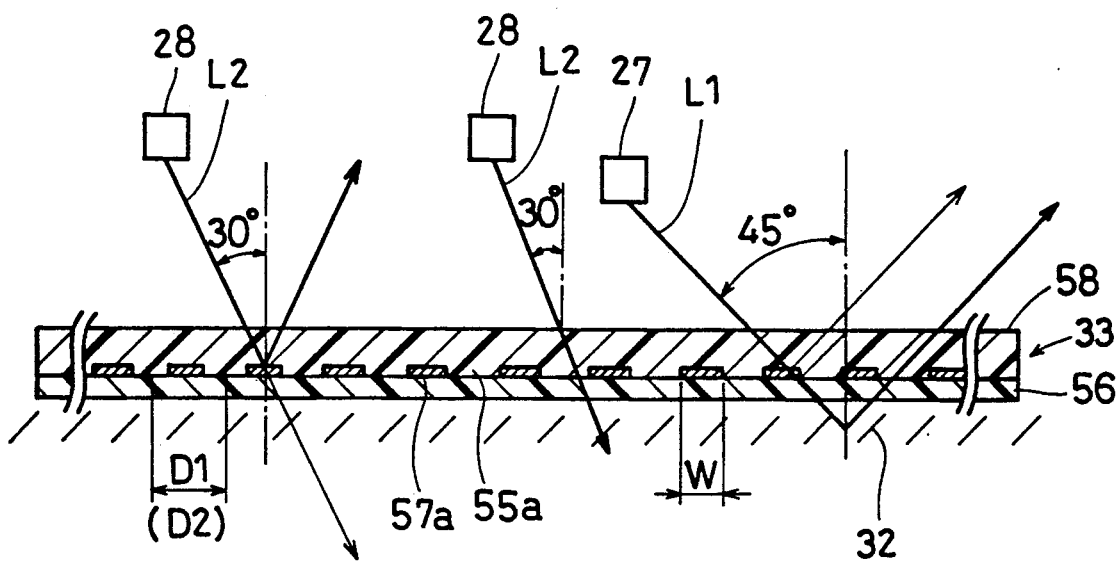
FIG. 11 is a schematic side sectional view, on an enlarged scale, of the sheet-like pad shown in FIG. 10.
Figure 12:
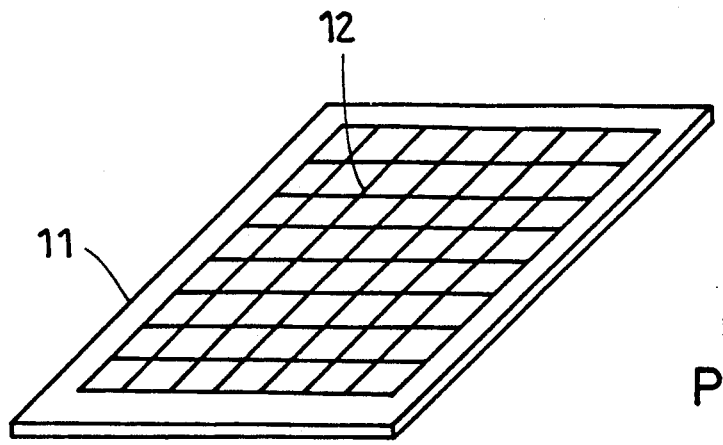
FIG. 12 is a schematic perspective view of the prior art sheet-like pad.
Figure 13:
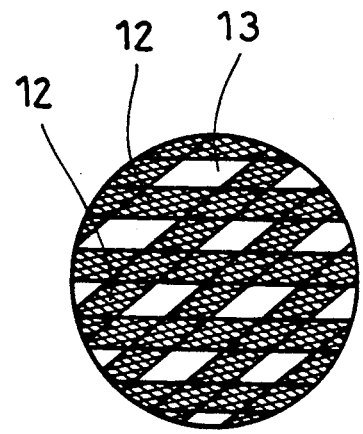
FIG. 13 is an enlarged fragmentary view of a portion of the prior art sheet-like pad shown in FIG. 12.
Figure 14:
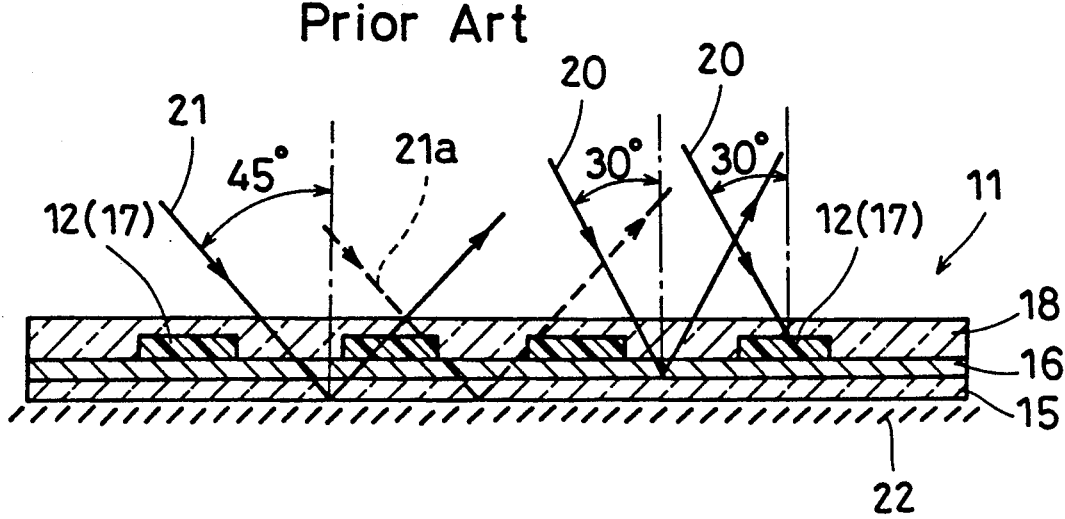
FIG. 14 is a schematic side sectional view, on an enlarged scale, of the prior art sheet-like pad shown in FIG. 12.

The sheet-like pad 33 according to another preferred embodiment of the present invention is shown in FIGS. 10 and 11. As shown in FIG. 10, the sheet-like pad 33 has a grid pattern comprised of grid lines 55a some extending in the X-axis direction and the remainder in the Y-axis direction. Each neighboring X-axis oriented grid lines 55a are spaced a predetermined pitch (periodicity) D2 and each neighboring Y-axis oriented grid lines 55a are spaced a predetermined pitch (periodicity) D1. Unlike the grid lines 55 in the foregoing embodiment of the present invention, the grid lines 55a in this preferred embodiment are delimited by generally square reflective layers 57a operable to reflect the infrared rays of light L2 and formed, as will be described later in detail, on the base layer 56 in a generally dot-like pattern.

Referring now to FIG. 11, the sheet-like pad 33 according to the embodiment shown therein comprises a multi-layered structure including the base layer 56 having an upper surface formed with a generally dot-like pattern of X-axis oriented and Y-axis oriented reflective layers 57a laid thereon so as to leave the discrete grid lines 55a defined by portions of the base layer 56 and capable of passing both the rays L1 and L2 therethrough. Each neighboring rows of reflective layers 57a oriented in the X-axis direction are spaced an equal distance from each other and, similarly, each neighboring columns of reflective layers 57a oriented in the Y-axis direction are spaced an equal distance from each other. The multi-layered structure of the sheet-like pad 33 also includes a transparent protective layer 58 formed on the base layer 56 so as to overlay the patterned reflective layers 57a, which layer 58 is made of material of a property capable of passing both visible and infrared rays of light L1 and L2 therethrough.

Even though the sheet-like pad 33 is so constructed as hereinabove described with reference to FIGS. 10 and 11, it can work in a manner similar to that according to the foregoing embodiment shown in and described with reference to FIGS. 8 and 9. Specifically, the infrared rays of light L2 emitted from the position sensor 28 are in part reflected by the patterned reflective layers 57a and in part passed through the discrete grid lines 55a, i.e., those portions of the base layer 56 delimited by the reflective layers 57a and, therefore, the position sensor 28 can provide binary signals which are subsequently counted to provide information descriptive of the position of the optical reader on the document 32.

In accordance with the present invention, where any one of the pitches D1 and D2 between each neighboring grid lines 55a and 55a is within the range of 0.33 to 0.34 mm, the width W of each reflective layer 57 should be chosen to be within the range of 0.16 to 0.17 mm as will be described later and should not be smaller than 0.16 mm. Because of this, in the first preferred embodiment shown in and described with reference to FIGS. 8 and 9, the total area of surface occupied by the reflective layers 57 forming the grid lines 55 will be relatively large. In contrast thereto, in the second preferred embodiment shown in and described with reference to FIG. 10 and 11, since the reflective layers 57a leave respective portions of the base layer 56 not occupied by the reflective layers 57a thereby to define square areas of uniform size in the grid pattern, the total area of surface occupied by the reflective layers 57a is relatively small. In practice, where each pitch D1 and D2 and the width W are chosen to be 0.34 mm and 0.17 mm, respectively, the total area of surface occupied by the reflective layers according to the second preferred embodiment of the present invention was found to be one third of that according to the first preferred embodiment of the present invention. Accordingly, since the amount of the visible rays of light L1 passing through the reflective layers 57a is small, the efficiency of utilization of the visible rays of light L1 according to the second preferred embodiment of the present invention is extremely higher than that according to the first preferred embodiment thereof.

In order for the position sensor 28 to exhibit a high operating precision, the reflective layers 57 or 57a should have a high reflectivity to the infrared rays of light L2 and also has a high light transmissivity to the visible rays of light L1. The reflectivity exhibited by each reflective layer 57 or 57a when near-infrared rays of light of 880 nm in wavelength are radiated so as to be incident upon such reflective layer 57 or 57a at an angle of incidence of 30° relative to the normal to the surface of the sheet-like pad 33 is preferred to be equal to or higher than 20% and the light transmissivity exhibited by the same reflective layer 57 or 57a when visible rays of light of 570 or 660 nm in wavelength are radiated so as to be incident upon such reflective layers 57 or 57a at an angle of incidence of 45° relative to the normal to the surface of the sheet-like pad 33 is preferred to be equal to or higher than 40%. Summarizing the foregoing, where the near-infrared rays of light of 880 nm in wavelength and the visible rays of light of 570 or 660 nm in wavelength are utilized, each reflective layer 57 or 57a employed in the practice of the present invention is preferably of a type capable of reflecting 20% or a higher amount of the near-infrared rays of light and passing 40% or a higher amount of the visible rays of light.

Each reflective layer 57 or 57a capable of reflecting the infrared rays of light as hereinbefore described may be in the form of a single reflective layer made of material capable of exhibiting a high reflectivity relative to the infrared rays of light and a high light transmissivity relative to the visible rays of light, such as, for example, gold, silver, copper or chromium. Alternatively, each reflective layer 57 or 57a may be in the form of a multi-layered structure comprising a dielectric layer of high refractive index made of, for example, $Ta_2O_5$ or $TiO_2$ and a dielectric layer of low refractive index made of, for example, $MgF_2$ or $SiO_2$ or a metallic layer made of, for example, Au or Cu, which have respective appropriate thicknesses and which are alternately laid one above the other so that the reflective layer 57 or 57a as a whole can exhibit a high reflectivity relative to the infrared rays of light and a high light transmissivity relative to the visible rays of light.

Where the reflective layer 57 or 57a is in the form of the single reflective layer, either a copper layer of a thickness within the range of, for example, 30 to 60 Å or a gold layer of a thickness within the range of, for example, 40 to 80 Å is preferred. On the other hand, where the reflective layer 57 or 57a is in the form of the multi-layered structure, a three-layered structure including $TiO_2$, Au and $TiO_2$ layers laid one above the other in the order given above from the base layer 56 is preferred.

In any event, the reflective layers 57 or 57a can be formed by forming an infrared reflective layer uniformly over the entire surface of the base layer 56 by the use of a vacuum evaporation method, a sputter coating method or an electro-depositing method and then removing unwanted portions of the reflective layer by the use of a photo-etching method to form the patterned reflective layers 57 or 57a.

Both of the base layer 56 and the protective layer 58 are made of polyester or glass and are of a type that the light transmissivity exhibited thereby, when the visible rays of light of 570 or 660 nm in wavelength are radiated so as to be incident upon such layer 56 or 58 at an angle of incidence of 45° relative to the normal thereto, and the light transmissivity exhibited thereby when the near-infrared rays of light of 880 nm in wavelength are radiated so as to be incident upon such layer 56 or 58 at an angle of incidence of 30° relative to the normal thereto can be equal to or higher than 50%, preferably 70% or higher.

Where the pitch D1 or D2 shown in FIGS. 8 and 10 is within the range of 0.33 to 0.34 mm, the width W of each reflective layer 57 or 57a is preferred to be within the range of 0.16 to 0.17 mm. If the width W is smaller than 0.16 mm, it will give a small quantity of the infrared rays of light L2 reflected thereby and, therefore, the detection of the grid pattern, that is, the positional information, by the position sensors 28 will be difficult. On the other hand, if the width W is greater than 0.17 mm, the light transmissivity to the visible rays of light L1 will be lowered to such an extent that the optical scanner 27 will fail to read the image at high precision.

In the practice of the present invention, the first and second rays of light L1 and L2 are preferred to be visible rays of light and infrared rays of light, respectively.

Again, in the practice of the present invention, the reflective layers 57 or 57a may suffice to be so patterned as to provide a periodic structure extending in X-axis and Y-axis directions perpendicular to each other and, therefore, may be formed in the form of a pattern of dots with upper and lower dots displaced relative to an intermediate dot in a direction parallel to the X-axis direction.

From the foregoing full description of the present invention made in connection with the preferred embodiments thereof, it is clear that no infrared absorbing layer hitherto employed in the prior art sheet-like pad is required and, therefore, the first rays of light emitted from the scanner will not pass through the infrared absorbing layer, and that a portion of the first rays of light merely pass through the reflective layers once or twice according to the present invention. Therefore, an attenuation of the first rays of light can be advantageously minimized, permitting a maximized utilization of the rays of light. In particular, where the reflective layers form respective square areas delimited by the grid lines forming the grid pattern such as in the second mentioned preferred embodiment of the present invention, the total area of surface occupied by the reflective layers can be made smaller than that of the system wherein the grid lines are defined by the reflective layers, thereby achieving an increased efficiency of utilization of the rays of light used in the system as a whole.

It is also clear that, since the reflective layers can be formed into the requisite periodic structure by the use of any known photo-etching technique, the sheet-like pad according to the present invention can readily and easily be assembled or manufactured with a stabilized quality. The use of the photo-etching technique should achieve a high dimensional precision of the reflective layers as compared with the conventional screen printing.

In addition, since the reflective layers are formed into a matrix-like periodic structure, the reflective layers can be minimized and be therefore rendered inexpensive as compared with the reflective layers formed all over the base layer.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. A sheet-like pad for placement between an image-bearing sheet and an optical reader to provide positional information for reading by an optical scanner during scanning of the image-bearing sheet thereby, said optical reader comprising the optical scanner for scanning the image-bearing sheet to read an image on the image-bearing sheet while the image-bearing sheet is radiated with first rays of light emitted therefrom and a position sensor means for reading the positional information on the sheet-like pad while the image-bearing sheet is radiated with second rays of light emitted theref. m, said sheet-like pad comprising:

a film-like base having upper and lower surfaces opposite to each other;

a reflective layer that is reflective and non-absorptive to the second rays of light and transmissive to the first rays of light, formed on an area of the upper surface of the base, for reflecting the second rays of light and for transmitting the first rays of light, the reflective layer being formed in a pattern which comprises the positional information of the sheet-like pad; and a protective layer formed on the upper surface of the base so as to overlay the reflective layer, each of the said base and said protective layer being made of material capable of passing therethrough both the first and second rays of light;

wherein the sheet-like pad consists only of materials transmissive to the first rays of light; and wherein the sheet-like pad does not include a material which is absorptive and non-reflective of the second rays of light.

2. The sheet-like pad as claimed in claim 1, wherein the pattern of the said reflective layer is formed in a grid pattern having a first group of equally spaced grid lines and a second group of equally spaced grid lines perpendicular to said first group of the equally spaced grid lines, all of said grid lines being constituted by said reflective layer.

3. The sheet-like pad as claimed in claim 1, wherein areas of the sheet-like pad not occupied by the reflective layer where both of the first and second rays of light pass through are formed in a grid pattern with the reflective layer occupying square areas of the grid pattern.

4. The sheet-like pad as claimed in claim 1, wherein said first rays of light are visible rays of light and said second rays of light are infrared rays of light.

5. The sheet-like pad as claimed in claim 1, wherein said reflective layer is formed by the use of a photo-etching technique.

6. The sheet-like pad as claimed in claim 1, wherein the pattern of the reflective layer comprises a plurality of rows each having a width which is one half of a pitch between each neighboring row of the reflective layer.

7. The sheet-like pad as claimed in claim 1, wherein the reflectivity exhibited by the reflective layer when near-infrared rays of light of 880 nm in wavelength are radiated so as to be incident upon such reflective layer at an angle of incidence of 30° relative to the normal to the sheet-like pad is equal to or higher than 20% and the light transmissivity exhibited by the same reflective layer when visible rays of light of 570 or 660 nm in wavelength are radiated so as to be incident upon such reflective layer at an angle of incidence of 45° relative to the normal to the sheet-like pad is equal to or higher than 40%.

8. The sheet-like pad as claimed in claim 1, wherein the reflective layer is made of material selected from the group consisting of copper and gold.

9. The sheet-like pad as claimed in claim 1, wherein the reflective layer is of a multi-layered structure including at least one dielectric layer of high refractive index and at least one dielectric layer of low refractive index, said dielectric layer of high refractive index being made of material selected from the group consisting of $Ta_2O_5$ and $TiO_2$ and said dielectric layer of low refractive index being made of material selected from the group consisting of $MgF_2$ and $SiO_2$.

10. The sheet-like pad as claimed in claim 9, wherein said reflective layer is of a triple layered structure including layers of TiO$_2$, Gold and TiO$_2$ laminated one above the other in this specific order.

11. The sheet-like pad as claimed in claim 1, wherein each of said base and said protective layer is made of material selected from the group consisting of polyester and glass.

* * * * *